United States Patent
Roundy et al.

(10) Patent No.: US 10,200,395 B1
(45) Date of Patent: Feb. 5, 2019

(54) SYSTEMS AND METHODS FOR AUTOMATED WHITELISTING OF FILES

(71) Applicant: Symantec Corporation, Mountain View, CA (US)

(72) Inventors: Kevin Alejandro Roundy, El Segundo, CA (US); Christopher Gates, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 196 days.

(21) Appl. No.: 15/084,515

(22) Filed: Mar. 30, 2016

(51) Int. Cl.
  G08B 23/00 (2006.01)
  G06F 12/16 (2006.01)
  G06F 12/14 (2006.01)
  G06F 11/00 (2006.01)
  H04L 29/06 (2006.01)

(52) U.S. Cl.
  CPC ................... *H04L 63/1433* (2013.01)

(58) Field of Classification Search
  CPC .................................................. H04L 63/1433
  USPC .......................................................... 726/25
  See application file for complete search history.

(56) References Cited

U.S. PATENT DOCUMENTS

| | | | | |
|---|---|---|---|---|
| 6,381,628 B1* | 4/2002 | Hunt | ...................... | G06F 9/465 709/201 |
| 9,729,564 B2* | 8/2017 | Hutton | ................ | H04L 63/1408 |
| 2003/0079158 A1* | 4/2003 | Tower | .................. | G06F 11/073 714/23 |
| 2011/0239184 A1* | 9/2011 | Feigen | ...................... | G06F 8/24 717/104 |
| 2012/0297486 A1* | 11/2012 | Turbin | .................. | G06F 21/562 726/24 |
| 2013/0091285 A1* | 4/2013 | Devarakonda | ........ | G06F 9/4856 709/226 |
| 2013/0227692 A1* | 8/2013 | Pavlyushchik | ....... | G06F 21/565 726/24 |
| 2014/0082729 A1* | 3/2014 | Shim | ...................... | G06F 21/51 726/23 |
| 2014/0130167 A1* | 5/2014 | Lee | ..................... | H04L 63/1408 726/24 |

(Continued)

OTHER PUBLICATIONS

Luca Invernizzi; Detecting Malware Distribution in Large-Scale Networks; CS.UCSB>EDU; year: 2014; p. 1-16.*

(Continued)

*Primary Examiner* — Monjur Rahim
(74) *Attorney, Agent, or Firm* — FisherBroyles, LLP

(57) ABSTRACT

The disclosed computer-implemented method for automated whitelisting of files may include (1) obtaining telemetry information that identifies files located on a set of computing systems, (2) establishing a whitelist of files for the set of computing systems by, for each file identified by the telemetry information, (A) calculating an amount by which a cost for using the whitelist will increase if the file is included in the whitelist, (B) calculating an amount by which whitelist coverage of files in the set of computing devices will increase if the file is included in the whitelist, (C) determining whether to include the file in the whitelist by balancing the increase in the cost against the increase in whitelist coverage, and (3) using the whitelist to protect the set of computing systems from undesirable files. Various other methods, systems, and computer-readable media are also disclosed.

20 Claims, 8 Drawing Sheets

(56) References Cited

U.S. PATENT DOCUMENTS

2015/0193618 A1* 7/2015 Takano ................ G06F 21/554
                                                    726/23
2015/0254474 A1* 9/2015 Nelke ................. G06F 21/6254
                                                    726/26
2016/0294849 A1* 10/2016 Adams .................... G06F 21/56

OTHER PUBLICATIONS

"Max-flow min-cut theorem", https://en.wikipedia.org/wiki/Max-flow_min-cut_theorem, as accessed Mar. 2, 2016, Wikipedia, (Sep. 13, 2006).

Azzedine Benameur; Systems and Methods for Generating Device-Specific Security Policies for Applications; U.S. Appl. No. 14/973,768, filed Dec. 18, 2015.

\* cited by examiner

SYSTEMS AND METHODS FOR AUTOMATED WHITELISTING OF FILES

BACKGROUND

Individuals and organizations often seek to improve the security of their computing systems. One method of improving computer security involves adding software and files to a whitelist. Whitelists generally identify sets of trusted files. For example, a computing system may achieve increased security by executing only whitelisted software packages and/or by permitting access only to whitelisted files. Whitelisting may be used in other ways as well. For example, a computer security system may gain certain efficiencies by forgoing security scans on whitelisted files since such files are already known to be trusted.

While whitelisting can be a powerful tool for improving system efficiency and/or preventing malicious files from harming a system, the ever-increasing quantity and/or complexity of software may make the process of creating and/or maintaining whitelists problematic and/or unwieldy. For example, software that might be considered safe and/or expected in one context may be indicative of problems in another context. As a specific example, software testing tools might be considered safe when installed on a developer's computer but considered problematic when installed on other computing systems. In the latter context, such files should be subject to increased scrutiny rather than added to a whitelist that protects those computing systems. The instant disclosure therefore identifies and addresses a need for improved systems and methods for the automated whitelisting of files.

SUMMARY

As will be described in greater detail below, the instant disclosure describes various systems and methods for automated whitelisting of files by whitelisting an optimized set of files that cover a certain percentage of computing systems within a set of computing systems to be protected by the whitelist. In one example, a computer-implemented method for automated whitelisting of files may include (1) obtaining telemetry information that identifies, for each computing system in a set of computing systems, files located on the computing system, (2) establishing a whitelist of files for the set of computing systems by, for each file identified by the telemetry information, (A) calculating an amount by which a cost for using the whitelist will increase if the file is included in the whitelist, (B) calculating an amount by which whitelist coverage of files in the set of computing systems will increase if the file is included in the whitelist, and (C) determining whether to include the file in the whitelist by balancing the increase in the cost against the increase in whitelist coverage, and then (3) using the whitelist to protect the set of computing systems from undesirable files.

In some embodiments, the computer-implemented method may include creating the set of computing systems by grouping a group of computing systems together based on how they are used within an organization. For example, grouping the computing systems together based on how they are used within the organization may include grouping the computing systems together based on the role within the organization of the users of the computing systems and/or a department within the organization of the users that access the computing systems. Additionally or alternatively, the computer-implemented method may further include grouping the computing systems together based on a type of software installed on the computing systems, a version of software installed on the computing systems, and/or a specific file installed on the computing systems.

In some examples, establishing the whitelist of files for the set of computing systems may include adding to the whitelist files that appear on at least a certain number of computing systems within the set of computing systems. Additionally or alternatively, calculating the amount by which the cost for using the whitelist will increase if the file is included in the whitelist may include basing the cost at least in part on a frequency with which the file is found within the set of computing systems. Furthermore, calculating the amount by which the cost for using the whitelist will increase if the file is included in the whitelist may include basing the cost at least in part on a reputation of the file.

In further examples, balancing the increase in the cost against the increase in whitelist coverage may include satisfying a coverage threshold that is met when at least a predefined percentage of computing systems in the set of computing systems store one or more files identified in the whitelist. Additionally or alternatively, balancing the increase in the cost against the increase in whitelist coverage may include minimizing the cost for using the whitelist while still satisfying the coverage threshold.

In some embodiments, calculating an amount by which the whitelist coverage of files in the set of computing systems will increase if the file is included in the whitelist may include evaluating the number of computing systems in the set of computing systems for which each file on the computing system is covered by the whitelist that includes the file. In such embodiments, calculating the increase in whitelist coverage may further include evaluating the number of computing systems that are completely covered by different permutations of whitelists that include the file.

The generated whitelist may be used in a variety of ways. For example, using the whitelist to protect the set of computing systems from undesirable files may include using the whitelist to protect the set of computing systems against malware and/or using the whitelist to prevent users from installing applications that cause security vulnerabilities in the set of computing systems.

In one embodiment, a system for implementing the above-described method may include (1) an telemetry module, stored in memory, that obtains telemetry information that identifies, for each computing system in a set of computing systems, files located on the computing system, (2) a calculating module, stored in memory, that establishes a whitelist of files for the set of computing systems by, for each file identified by the telemetry information, (A) calculating an amount by which a cost for using the whitelist will increase if the file is included in the whitelist, (B) calculating an amount by which whitelist coverage of files in the set of computing systems will increase if the file is included in the whitelist, and (C) determining whether to include the file in the whitelist by balancing the increase in the cost against the increase in whitelist coverage, (3) a protecting module, stored in memory, that uses the whitelist to protect the set of computing systems from undesirable files, and (4) at least one physical processor configured to execute the telemetry module, the calculating module, and the protecting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) obtain telemetry information that identifies, for each computing system in a set of computing systems, files located on the computing system, (2) establish a whitelist of files for the set of computing systems by, for each file identified by the telemetry information, (A) calculating an amount by which a cost for using the whitelist will increase if the file is included in the whitelist, (B) calculating an amount by which whitelist coverage of files in the set of computing systems will increase if the file is included in the whitelist, and (C) determining whether to include the file in the whitelist by balancing the increase in the cost against the increase in whitelist coverage, and (3) use the whitelist to protect the set of computing systems from undesirable files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
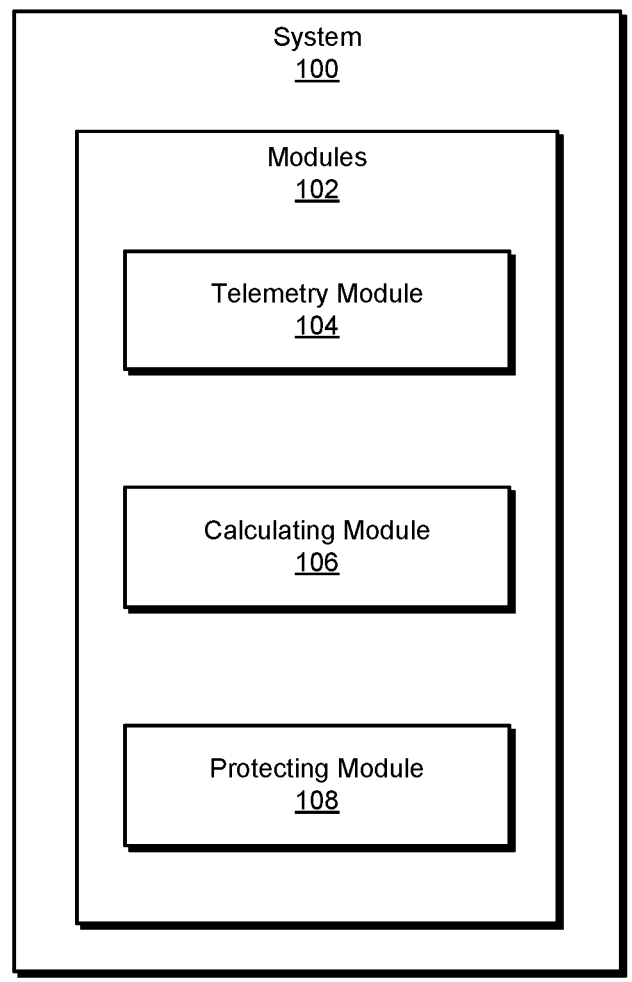
FIG. 1 is a block diagram of an exemplary system for automated whitelisting of files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automated whitelisting of files. As will be explained in greater detail below, the systems and methods described herein may enable rapid and efficient creation of whitelists that are tailored to a particular group of computing systems, thus allowing for more detailed control over what files are permitted on those systems as opposed to using a more generalized approach.

Figure 2:
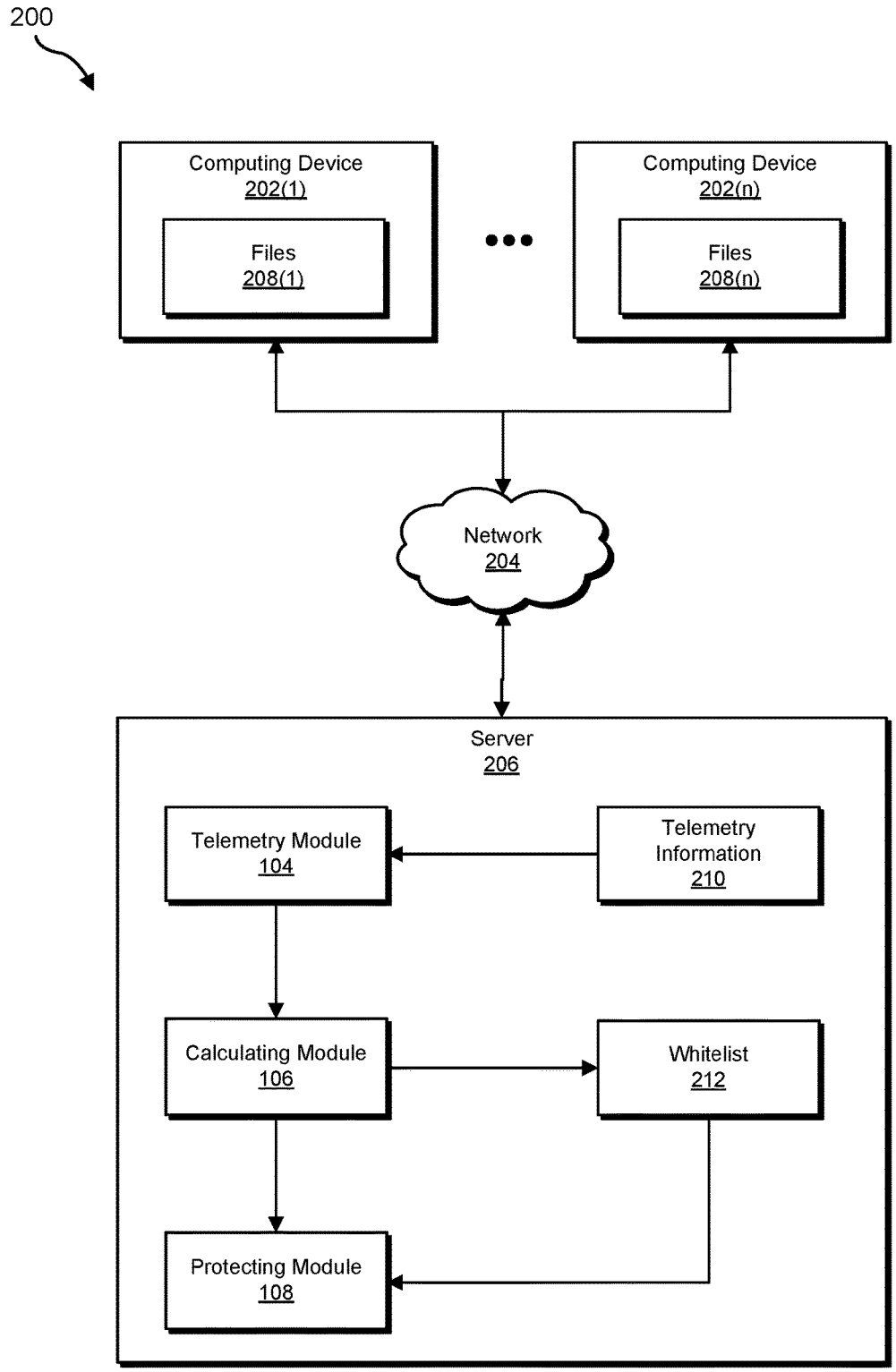
FIG. 2 is a block diagram of an additional exemplary system for automated whitelisting of files.

The following will provide, with reference to FIGS. 1-2, detailed descriptions of exemplary systems for automated whitelisting of files. Detailed descriptions of corresponding computer-implemented methods will also be provided in connection with FIG. 3. Detailed descriptions of exemplary systems for grouping computing systems by role will be provided in connection with FIG. 4, and exemplary flow graphs for determining which files to add to a whitelist will be provided in connection with FIGS. 5 and 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for automated whitelisting of files. As illustrated in this figure, exemplary system 100 may include one or more modules 102 for performing one or more tasks. For example, and as will be explained in greater detail below, exemplary system 100 may include a telemetry module 104 that obtains telemetry information that identifies, for each computing system in a set of computing systems, files located on the computing system. Exemplary system 100 may additionally include a calculating module 106 that establishes a whitelist of files for the set of computing systems. Calculating module 106 may establish the whitelist by calculating an amount by which a cost for using the whitelist will increase if the file is included in the whitelist and/or by calculating an amount by which whitelist coverage will increase if the file is included in the whitelist. Furthermore, calculating module 106 may determine whether to include the file in the whitelist by balancing the increase in the cost against the increase in whitelist coverage. Moreover, exemplary system 100 may include a protecting module 108 that uses the whitelist to protect the set of computing systems from undesirable files. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a set of computing devices 202(1)-(n) in communication with a server 206 via a network 204. In one example, one or more of computing devices 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to automatically generate a whitelist for a collection of computing systems based on files present on those computing systems. For example, and as will be described in greater detail below, one or more of modules 102 may cause computing device 202 and/or server 206 to automatically generate a customized whitelist of files for one or more of computing devices 202(1)-(n). For example, and as will be described in greater detail below, telemetry module 104 may obtain telemetry information 210 that identifies, for each of computing devices 202(1)-(n), files 208(1)-(n) located on computing devices 202(1)-(n). Calculating module 106 may establish a whitelist 212 of files for computing devices 202(1)-(n) by, for each file identified by telemetry information 210 (i.e., each of files 208), calculating an amount by which a cost for using whitelist 212 will increase if the file is included in whitelist 212, calculating an amount by which whitelist 212 coverage of files in the set of computing devices will increase if the file is included in whitelist 212, and determining whether to include the file in whitelist 212 by balancing the increase in the cost against the increase in whitelist 212 coverage. Protecting module 108 may use whitelist 212 to protect the set of computing systems from undesirable files.

Computing device 202 generally represents any type or form of computing device and/or computing system capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, virtualized variations of one or more of the same, exemplary computing system 710 in FIG. 7, or any other suitable computing device.

Server 206 generally represents any type or form of computing device that is capable of receiving a listing of files on various computing devices and generating a whitelist from that listing. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
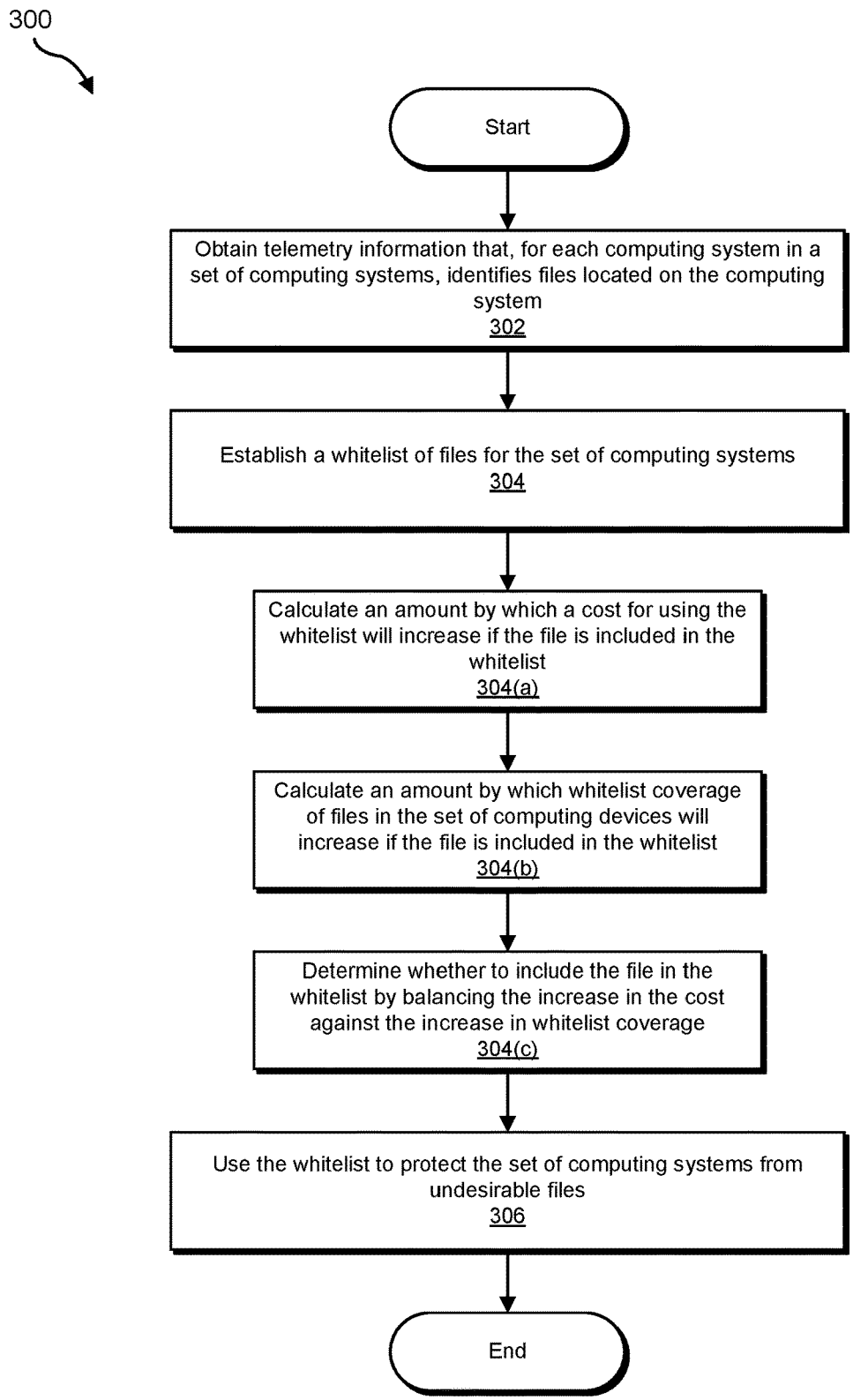
FIG. 3 is a flow diagram of an exemplary method for automated whitelisting of files.

FIG. 3 is a flow diagram of an exemplary computer-implemented method 300 for automated whitelisting of files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may obtain telemetry information that identifies, for each computing system in a set of computing systems, files located on the computing system. For example, telemetry module 104 may, as part of server 206 in FIG. 2, obtain telemetry information 210 that identifies, for each computing system in a set of computing devices 202(1)-(n), files located on the computing system.

Telemetry module 104 may receive telemetry information 210 in a variety of contexts. For example, telemetry module 104 may receive file reports from endpoint agents (e.g., antivirus software and/or file integrity software) installed on computing devices 202(1)-(n). Additionally or alternatively, telemetry module 104 may receive notifications from operating systems installed on computing devices 202(1)-(n). In some embodiments, telemetry module 104 may receive telemetry information from a very large number of computing systems, such as all computing systems owned by a global organization (e.g., MICROSOFT). Telemetry module 104 may also receive telemetry information from smaller numbers of computing devices (e.g., set of computing devices 202(1)-(n) may include only a single computing device).

Furthermore, telemetry module 104 may group the computing systems in a variety of ways. In some embodiments, an administrator may manually assign various computing devices to particular groups. Additionally or alternatively, telemetry module 104 may create a set of computing systems by grouping computing systems together based on how they are used within an organization. For example, telemetry module 104 may group computing systems together based on a department and/or role within the organization of the users that access the computing devices. As a specific example, telemetry module 104 may extract department information from MICROSOFT ACTIVE DIRECTORY entries for the users of the computing systems. Telemetry module 104 may determine the department of the users through a variety of other methods, including grouping the computing systems together based on their position within a MICROSOFT HOMEGROUP and/or based on names of the computing systems.

In some examples, telemetry module 104 may group computing systems together based on their physical proximity to each other. For example, telemetry module 104 may assign all computing systems located within a particular building to the same group. Alternatively, telemetry module 104 may group computing systems together regardless of the physical proximity of the computing systems. For example, a global organization may have many physical offices that each have their own software development department. Telemetry module 104 may group the computing systems owned by software development departments together for the purpose of generating a whitelist specific to software development departments even though the individual computing systems may be located in different physical offices.

Figure 4:
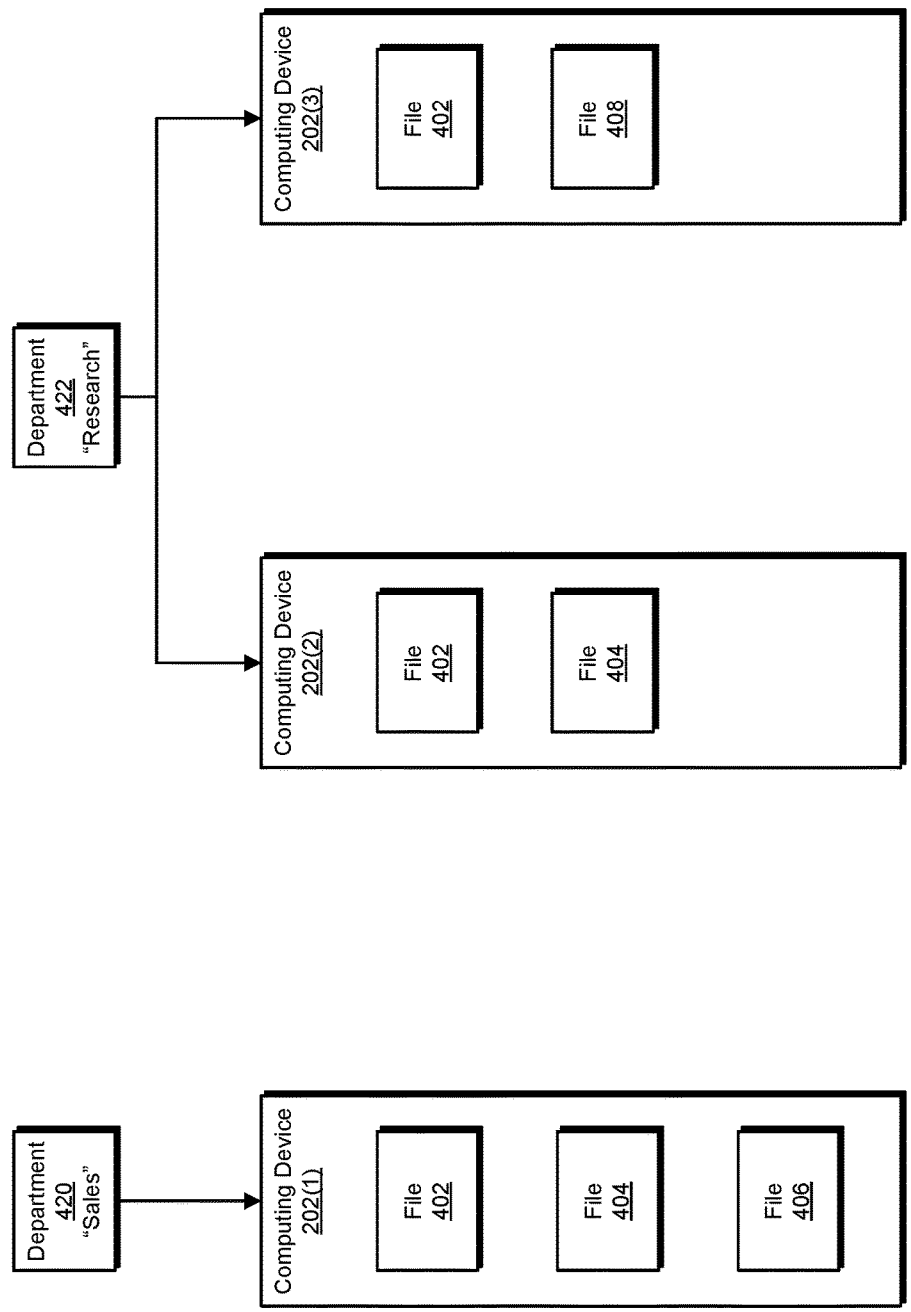
FIG. 4 is a block diagram of an exemplary set of computing systems.

An illustrated example of computing systems to be grouped together is provided in connection with FIG. 4. As illustrated, computing device 202(1) may host copies of files 402, 404, and 406, and be part of a particular department 420, "sales." A second computing device, computing device 202(2), may host copies of files 402 and 404 and be part of department 422, "research." A third computing device, computing device 202(3), may also be part of department 422 and host copies of files 402 and 408. In the example of FIG. 4, files 402, 404, 406, and 408 generally represent any file or software that might be present on a computing system, including but not limited to operating system files, user-installed software, applications, documents, or any other file that may be present on a computing system. As described above, telemetry module 104 may group computing systems together based on department. According to this grouping scheme, telemetry module 104 may assign computing device 202(1) to a group that represents the sales department, and assign computing devices 202(2) and 202(3) to a second group that represents the research department.

Telemetry module 104 may additionally or alternatively use other metrics to group computing systems together. For example, telemetry module 104 may group computing systems together based on a type of software installed on the computing systems, a version of software installed on the computing systems, and/or a specific file installed on the computing systems. For example, telemetry module 104 may group computing systems together based on the presence of particular software packages, the version of an operating system installed on the computing systems, the presence of a specific configuration file, and/or any other suitable indicator that the computing systems should be treated as a collective group.

As a specific example and returning to the example of FIG. 4, telemetry module 104 may group computing systems together based on a specific file installed on the computing systems. In this example, file 402 may represent a key file that will be present on all computing devices of a particular group, such as an e-mail client on personal computers. Note that computing devices 202(1), 202(2), and 202(3) each contain a copy of file 402. Telemetry module 104 may accordingly assign computing devices 202(1), 202(2), and 202(3) to the same group. Once telemetry module 104 has established a group of computing systems, the systems and methods described herein may establish a whitelist of files for the group of computing systems.

At step 304 in FIG. 3, one or more of the systems described herein may establish a whitelist of files for the set of computing systems by, for each file identified by the telemetry information. For example, calculating module 106 may, as part of server 206 in FIG. 2, establish whitelist 212 of files for computing devices 202(1)-(n).

Whitelist 212 generally represents a listing of files, applications, or any other suitable data that is expected to be present and/or considered safe for use on a computing system that is protected by the whitelist. Calculating module 106 may establish whitelist 212 in a variety of ways. In some embodiments, calculating module 106 may establish the whitelist of files for the set of computing systems by whitelisting files that appear on at least a certain number of computing systems within the set of computing systems. For example calculating module 106 may select a certain number of files that appear at a certain frequency or higher within the set of computing systems. As a specific example and with reference to FIG. 4, calculating module 106 may whitelist files that appear on at least two of the three computing devices in the group. Assuming that telemetry module 104 assigned all three computing devices to the same group, calculating module 106 would then whitelist files 402 and 404, as those files appear on at least two of the three computing systems. Conversely, files 406 and 408 would not be whitelisted because they do not satisfy the frequency threshold. Additionally or alternatively, and as will be described below in connection with steps 304(a), 304(b), and 304(c) in FIG. 3, calculating module 106 may determine whether to whitelist a file based on balancing a calculated cost of adding the file to the whitelist against the increase in coverage of computing systems provided by whitelisting the file.

Returning to FIG. 3 at step 304(a), one or more of the systems described herein may calculate an amount by which a cost for using the whitelist will increase if the file is included in the whitelist. For example, calculating module 106 may, as part of computing device 202 in FIG. 2, calculate an amount by which a cost for using whitelist 212 will increase if the file is included in whitelist 212.

Calculating module 106 may calculate the cost for adding the file to the whitelist based on a variety of factors. For example, calculating module 106 may base the cost at least in part on a frequency with which the file is found within the set of computing systems. Calculating module 106 may assign a lower whitelisting cost to files that appear more frequently within the set of computing systems, as more frequent files are more likely to be trusted and/or expected to be present in the group of computing systems by users of the computing systems. Conversely, calculating module 106 may assign a higher whitelisting cost to files that do not appear very frequently within the set of computing systems, as those files may not be generally expected to appear on computing systems within the group.

Furthermore, calculating module 106 may calculate the amount by which the cost for using the whitelist will increase if the file is included in the whitelist by basing the cost at least in part on a reputation of the file. High-reputation or trusted files are generally known to be unlikely to harm a computing system. Accordingly, calculating module 106 may assign a lower whitelisting cost to high-reputation or trusted files. Conversely, calculating module 106 may assign a higher cost to files with lower or unknown reputations, as those files may cause harm to computing systems protected by the whitelist. Files that are prevalent within a group of computing systems but have a low reputation (e.g., known malicious files will be very low reputation files) may thus present a heavy cost for using whitelists that include those files. As will be described in greater detail below, this cost may accordingly prevent known malicious or harmful files from being added to a whitelist. Similarly, less-frequent but highly trusted files (e.g., an individual's particular choice of vetted web browser) may present a low cost for whitelists that include those files, thus allowing trusted files to be added to the whitelist even though they may not appear frequently within the group of computing systems.

Calculating module 106 may additionally or alternatively use a variety of other data and/or forms of analysis in order to assign a cost increase for adding the file. For example, and without limitation, calculating module 106 may base the cost increase at least in part on file metadata, administrator- or user-generated lists of expected and/or known safe files, or any other suitable method for calculating an amount by which the cost for using the whitelist will increase if the file is included in the whitelist. Calculating module 106 may also calculate the cost increase based on how much a burden on computing resources (e.g., an anti-malware system) would increase if the file is included in the whitelist.

In some embodiments, calculating module 106 may use a combination of the above-described methods for calculating the amount by which the cost for using the whitelist will increase if the file is included in the whitelist. For example, calculating module 106 may base the cost increase for a particular file on a combination of the file's reputation in conjunction with how frequently the file appears in the group of computing systems.

At step 304(b), one or more of the systems described herein may calculate an amount by which whitelist coverage of files in the set of computing devices will increase if the file is included in the whitelist. For example, calculating module 106 may, as part of computing device 202 in FIG. 2, calculate an amount by which whitelist coverage of files in the set of computing devices will increase if the file is included in whitelist 212.

Calculating module 106 may calculate the increase in coverage in a variety of ways. In some embodiments, calculating module 106 may calculate the amount by which whitelist coverage will increase based on the percentage of total files accepted by the whitelist if the file is included in the whitelist. For example, and with reference to FIG. 4, the illustrated group of three computing systems hosts four unique files, files 402, 404, 406, and 408. However, there are three separate instances of file 402, two instances of file 404, and one instance each of files 406 and 408, for a total of seven file instances. In this example, calculating module 106 may determine that including file 402 may increase whitelist coverage by a greater factor than including, for example, file 408. Again, calculating module 106 may treat this coverage factor as a percentage. In the example of FIG. 4, calculating module 106 may determine that including file 402 increases whitelist coverage by $3/7$, or approximately 42.9%, versus an increase of $1/7$, or 14.3%, for including file 408 on the whitelist. Once calculating module 106 has determined a cost and an increase in whitelist coverage for including the file in the whitelist, calculating module 106 may determine whether to include the file in the whitelist.

Moreover, calculating module 106 may calculate the increase in whitelist coverage based at least in part on the number of computing systems in the group that have a certain percentage of their files represented on the whitelist. For example, calculating module 106 may increase the coverage value of a whitelist for each computing system whose files are all included on the whitelist. Alternatively, calculating module 106 may increase the coverage value of a whitelist for each computing system that has at least 90% of its files represented on the whitelist. In some embodiments, calculating module 106 may assign a coverage weight to each computing system in the group of computing systems, where the coverage weight of a given computing system is awarded to a whitelist that includes a predetermined percentage of files on the computing system. Calculating module 106 may treat this coverage weight as a percentage. Furthermore, calculating module 106 may assign different coverage weights to different computing systems based on the importance of that computing system. For example, calculating module 106 may assign a greater coverage weight to an administrator's computing system than a publicly available terminal.

Returning to FIG. 3 at step 304(c), one or more of the systems described herein may determine whether to include the file in the whitelist by balancing the increase in the cost against the increase in whitelist coverage. For example, calculating module 106 may, as part of computing device 202 in FIG. 2, determine whether to include the file in whitelist 212 by balancing the increase in the cost against the increase in whitelist 212 coverage.

Calculating module 106 may use a variety of metrics to balance the increase in the cost against the increase in whitelist coverage. In some embodiments, calculating module 106 may identify a whitelist that satisfies a coverage threshold that is met when at least a predefined percentage of computing systems in the set of computing systems store one or more files identified in the whitelist. In some examples, a computing system may count towards the coverage threshold only if every file on the computing system is represented on the whitelist. In other examples, a computing system may count towards the coverage threshold if at least a certain percentage of files on the computing system are represented on the whitelist. Calculating module 106 may balance the increase in the cost against the increase in whitelist coverage by minimizing the cost for using the whitelist while still satisfying the coverage threshold.

In some embodiments, calculating module 106 may calculate module 106 may calculate the amount by which whitelist coverage of files in the set of computing systems will increase if the file is included in the whitelist by evaluating the number of computing systems for which each file on the computing system is covered by a whitelist that includes the file. Additionally, calculating module 106 may evaluate the number of computing systems that are completely covered by different permutations of whitelists that include the file. For example, calculating module 106 may construct a flow graph that represents each computing system in the set of computing systems as well as each unique file that is present on the set of computing systems.

Figure 5:
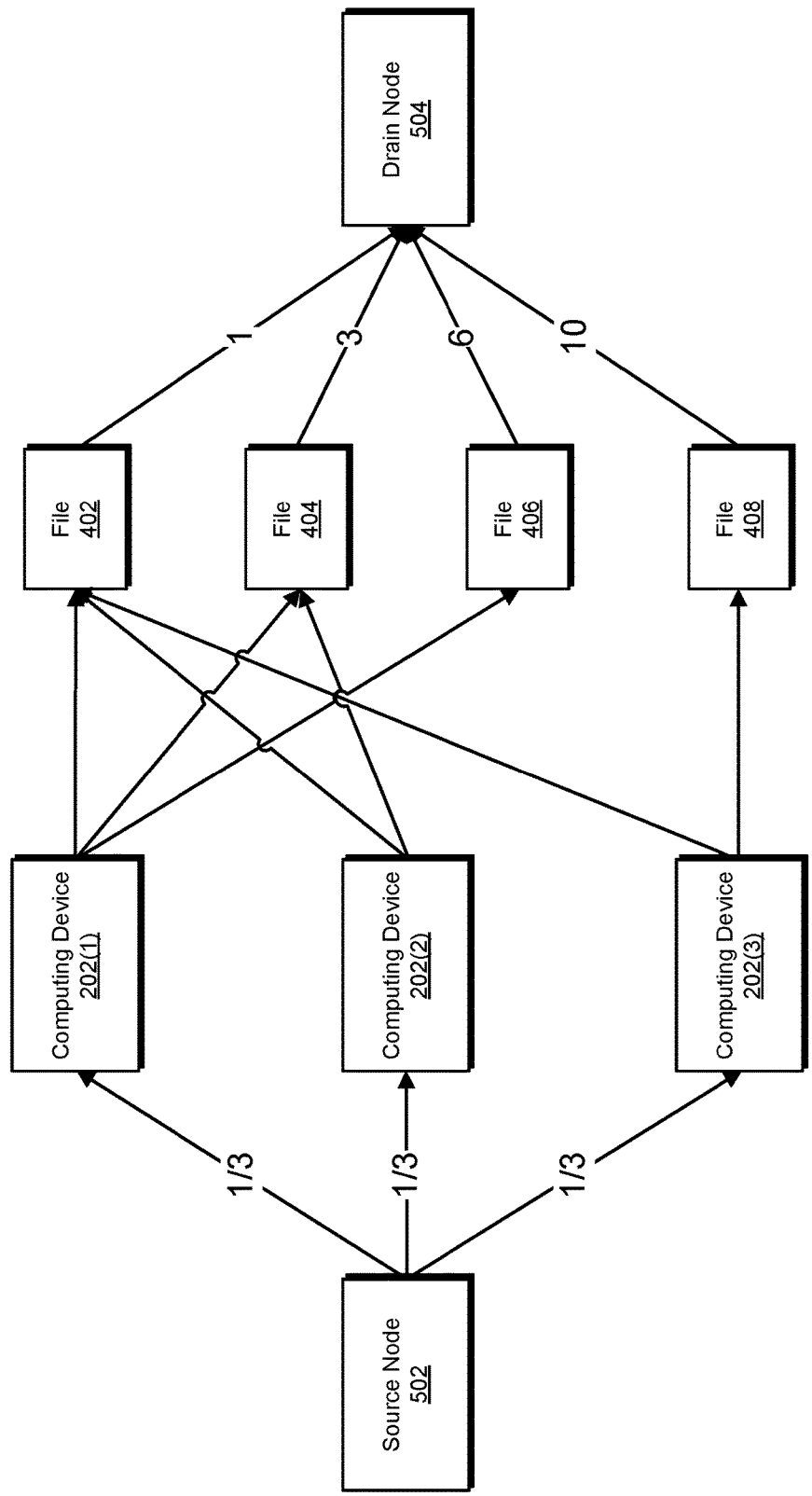
FIG. 5 is a block diagram of an exemplary flow graph for selecting files to add to a whitelist.

An illustrated example of such a graph is provided in connection with FIGS. 4 and 5. As described in greater detail above, telemetry module 104 may assign computing devices 202(1), 202(2), and 202(3) to a particular group of computing systems. Calculating module 106 may determine an optimized set of files to whitelist by generating a graph with a source node 502 that connects to machine nodes that represent the computing devices in the group. Calculating module 106 may, as described in greater detail above, assign a coverage weight to each computing device and assign the calculated coverage weight to the connection between the source node and the corresponding machine node. In this example, calculating module 106 has assigned an equal weight to each connection, of $1/3$. Calculating module 106 may also generate file nodes for each unique file present on the group of computing systems. As illustrated in FIG. 4, the group of computing devices hosts files 402, 404, 406, and 408. Calculating module 106 may accordingly generate file nodes corresponding to each unique file (i.e., all three instances of file 402 are represented by a single file node) and connect each machine node to the file nodes that represent files hosted on the computing system represented by the machine node. As shown in FIG. 4, computing device 202(1) hosts files 402, 404, and 406. Calculating module 106 may thus connect the machine node for computing device 202(1) to the file nodes for files 402, 404, and 406. Calculating module 106 may repeat this process for each computing system in the group of computing systems to connect the machine node for computing device 202(2) to file nodes for files 402 and 404, and connect the machine node for computing device 202(3) to file nodes for files 402 and 408. Calculating module 106 may connect each file node to a drain node 504, and assign cost weights to each of these connections. As described in greater detail above, calculating module 106 may base the cost for including the file in the whitelist on a frequency of the file within the group of computing systems. In the example of FIG. 5, calculating module 106 has assigned a lower cost to more frequent files, resulting in a cost of 1 for including file 402, a cost of 3 for including file 404, a cost of 6 for including file 406, and a cost of 10 for including file 408.

As described above, calculating module 106 may use a variety of methods and/or metrics to select files for whitelisting. As one particular example, calculating module 106 may use the graph represented in FIG. 5 to establish a whitelist with a coverage weight of at least $2/3$. Calculating module 106 may then attempt to optimize the cost of the whitelist while still meeting the coverage threshold by "cutting" connections in the graph. Calculating module 106 may consider a connection between a file node and the sink node to be cut if the file corresponding to the file node is added to the whitelist, and consider a connection between the source node and a machine node to be cut if not every file on the corresponding computing system is represented on the whitelist. In other words, calculating module 106 may attempt to cut connections to completely block flow from the source node to the sink node while preserving as much coverage value as possible with as little cost as possible.

Figure 6:
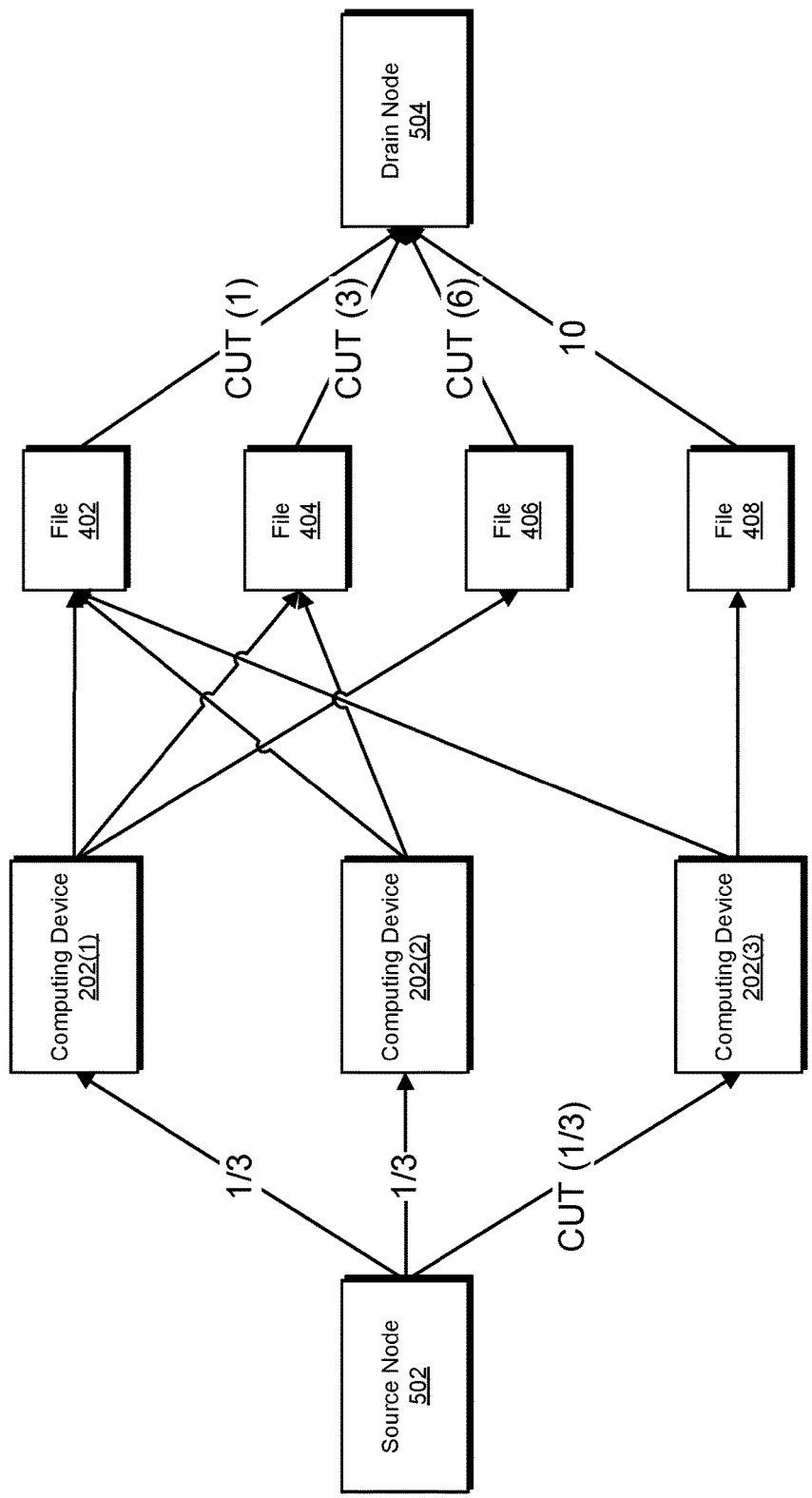
FIG. 6 is an additional block diagram of an exemplary flow graph for selecting files to add to a whitelist.

An example of a cut permutation of the graph is provided in connection with FIG. 6. As shown in FIG. 6, calculating module 106 may use a coverage threshold of ⅔, meaning that the final cut of the graph must preserve a coverage value of at least ⅔ with as little cost as possible. Calculating module 106 may therefore "cut" the connections between file nodes corresponding to files 402, 404, and 406, indicating that these files should be added to the whitelist, for a total file cut cost of 10 (1 for file 402, 3 for file 404, and 6 for file 406). However, the connection between the node for file 408 and drain node 504 remains, so in order to block all flow from source node 502 to drain node 504, calculating module 106 must cut the connection between source node 502 and the machine node for computing device 202(3), indicating that computing device 202(3) is not completely covered by the whitelist. Fortunately, the remaining machine nodes for computing devices 202(1) and 202(2) each carry a coverage weight of ⅓, for a total coverage weight of ⅔, which satisfies the coverage threshold. Calculating module 106 may attempt other permutations of whitelisted files and compare the costs of permutations that still satisfy the coverage threshold. For example, whitelisting files 402, 404, and 408 would provide a graph cut that yields a coverage value of ⅔. However, the total cost for such a whitelist comes out to 14, which is a higher cost than the above-described whitelist containing files 402, 404, and 406. Calculating module 106 may therefore consider the first whitelist to be more optimal than the second whitelist.

Although the above-described example includes a mere three computing systems and four different files, typical groups of computing systems may span more than a hundred computing systems and host many thousands of files. Flow graphs representing these systems may accordingly develop corresponding levels of complexity. Calculating module 106 may accordingly use a variety of algorithms not described here to analyze these flow graphs in order to determine an optimized whitelist that preserves as much coverage weight as possible while adding the lowest total cost of files to the whitelist.

Calculating module 106 may additionally or alternatively use a variety of other methods to balance the increase in cost against the increase in whitelist coverage. For example, calculating module 106 may select a particular number of the lowest-cost files to add to the whitelist. In further examples, calculating module 106 may whitelist a particular number of the most frequent files that are found on at least a certain number of computing systems within the group of computing systems. Returning to the example of FIG. 4, calculating module 106 may whitelist the two most frequently appearing files that appear on at least two computing systems. In this example, calculating module 106 may whitelist files 402 and 404, but not files 406 or 408.

At step 306 in FIG. 3, one or more of the systems described herein may use the whitelist to protect the set of computing systems from undesirable files. For example, protecting module 108 may, as part of computing device 202 in FIG. 2, use whitelist 212 to protect the set of computing systems from undesirable files.

Protecting module 108 may protect the set of computing systems from undesirable files in a variety of ways, such as preventing unexpected files from being installed on the computing systems protected by the whitelist. Additionally or alternatively, protecting module 108 may use the whitelist to protect the set of computing systems against malware and/or using the whitelist to prevent users from installing applications that may cause security vulnerabilities in the set of computing systems. For example, protecting module 108 may provide whitelist 212 to software security systems that block the installation of software and/or files that are not represented on the whitelist. Generally speaking, the whitelist represents applications and/or files that are expected to be found on the computing systems in the group of computing systems, and can be used to prevent the installation of software that may be generally regarded as safe, but might be considered suspicious in the context of a particular group of computing systems.

As a specific example, a software development department in an organization may routinely use various software testing tools. As such, these tools would likely be found on many different computers within that department, and so the software testing tools may be present on a whitelist generated by the systems and methods described herein that protects software development computers. However, it is unlikely that a computer in the human resources department would install these tools. As such, a whitelist generated using the systems and methods described herein that protects the computers in the human resources department would likely not include the software testing tools on a whitelist that protects the human resources computers, and protecting module 108 would accordingly protect the human resources computers against installations of those software testing tools.

As described in greater detail above, the systems and methods described herein may generate customized whitelists by identifying a group of computing systems that share certain features in common and generating a whitelist for those computing systems based on files already present on those computing systems. The systems and methods described herein may thus allow for a more fine-grained approach to whitelisting, preventing generally safe but unexpected applications and/or files from being placed on specific computing systems in addition to protecting the computing systems from known malicious software and/or files.

Figure 7:
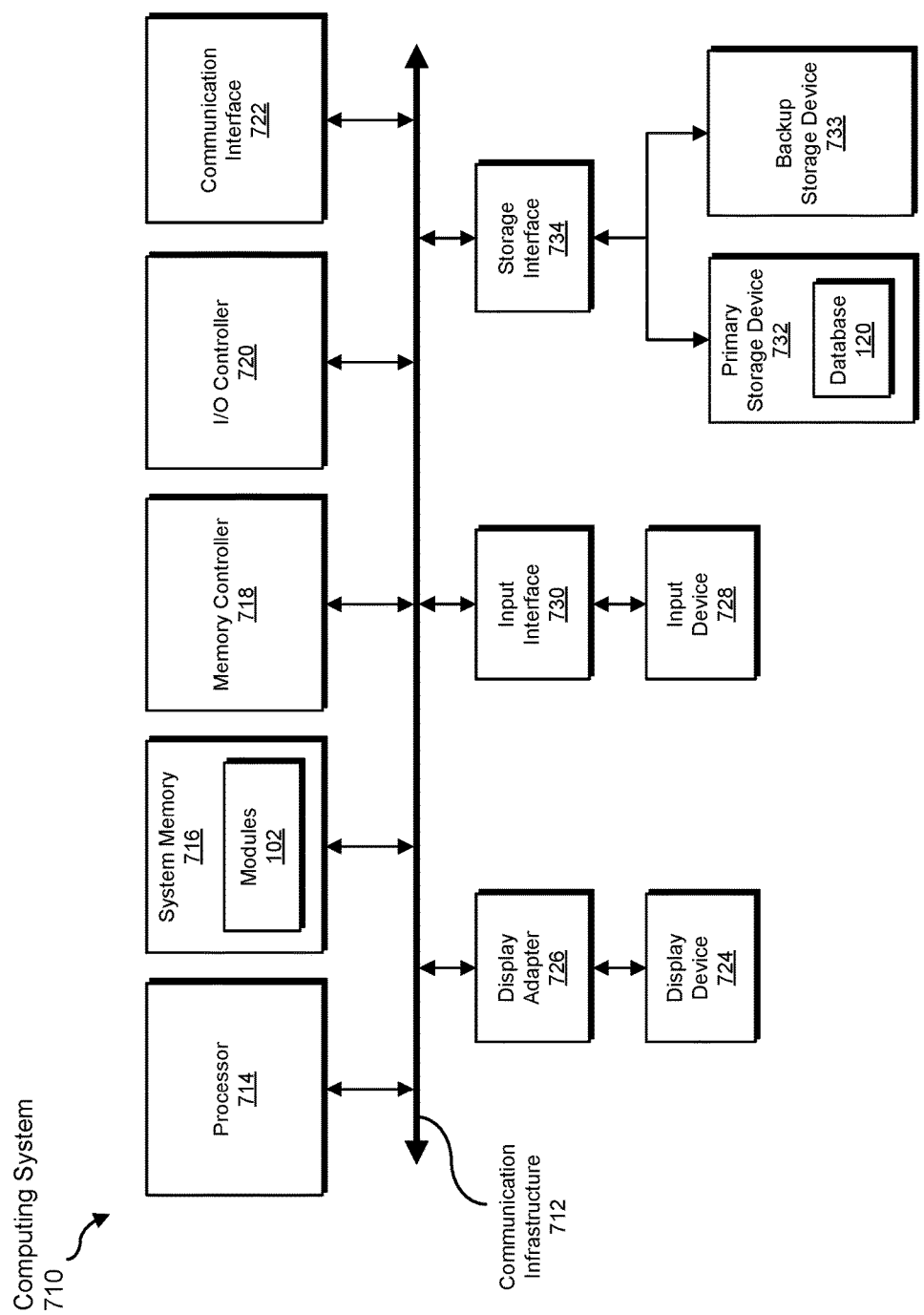
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
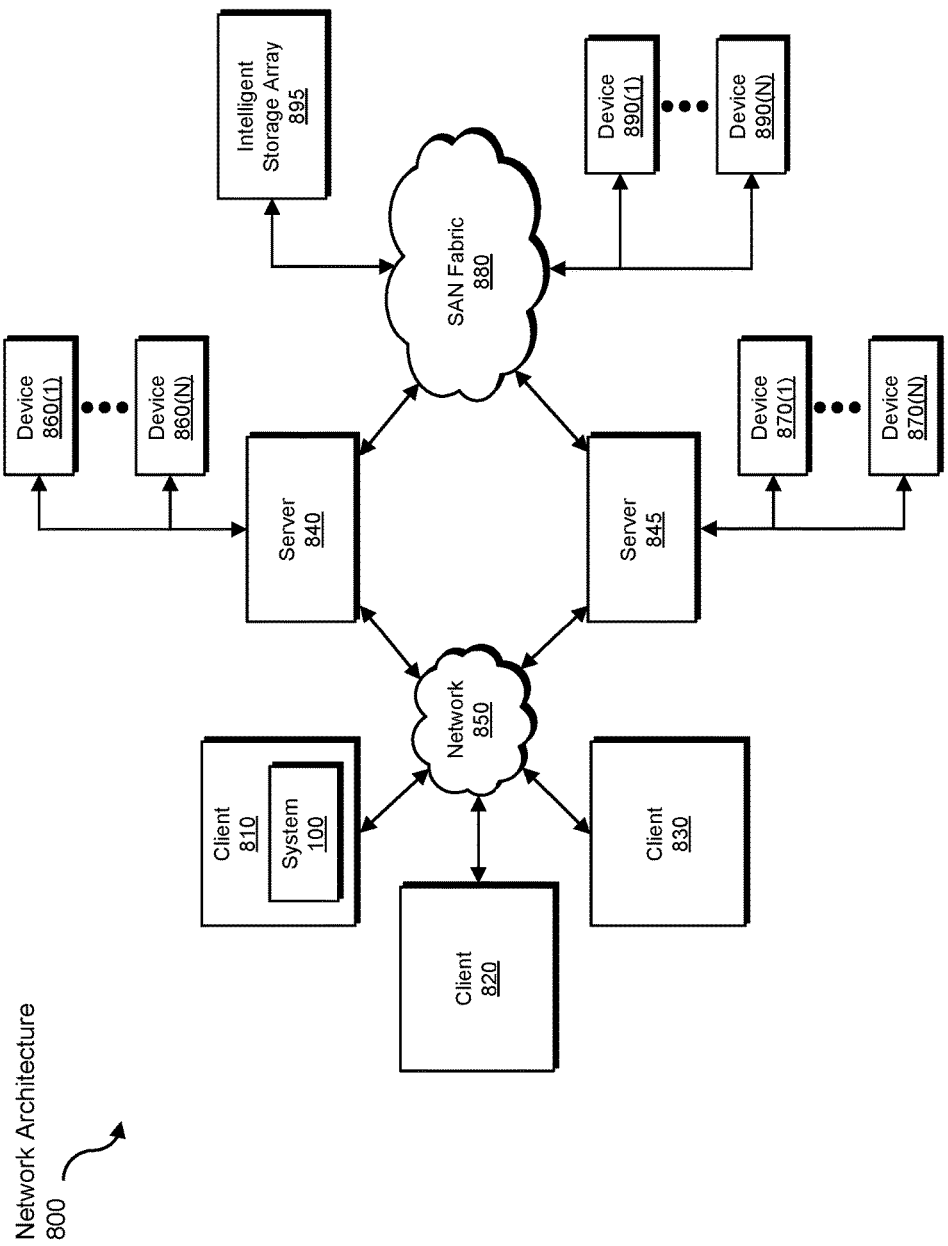
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for automated whitelisting of files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive telemetry data to be transformed, transform the telemetry data into groups of computing systems and lists of files, use a result of the transformation to generate a flow graph that describes the associations between the computing systems and the files, use the flow graph to generate a whitelist, store the whitelist in a database, and/or use the whitelist to protect the computing systems from unwanted files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated whitelisting of computer files, at least a portion of the method being performed by a computing device comprising at least one processor, the method comprising:
    obtaining, by the computing device, telemetry information that identifies, for each computing system in a set of computing systems, computer files located on the computing system;
    grouping, by the computing device, selected computing systems based on how they are used within an organization by grouping the selected computing systems of the set of computing systems into a group of computing systems that each store a specific computer file and share a role or a department of users within the organization as indicated by the telemetry information;
    establishing, by the computing device, a whitelist of computer files for the group of computing systems by, for each file identified by the telemetry information:
    calculating, by the computing device, an amount by which a cost for using the whitelist will increase if the file is included in the whitelist;
    calculating, by the computing device, an amount by which whitelist coverage of computer files in the group of computing systems will increase if the file is included in the whitelist;
    determining, by the computing device, whether to include the file in the whitelist by balancing the increase in the cost against the increase in whitelist coverage and determining if a coverage threshold is met; and
    using, by the computing device, the whitelist to protect the group of computing systems from undesirable computer files by preventing the undesirable computer files from being installed on the group of computing systems protected by the whitelist.

2. The method of claim 1, further comprising creating the group of computing systems by grouping a plurality of computing systems together based on how they are used within an organization.

3. The method of claim 2, wherein grouping the plurality of computing systems together based on how they are used within the organization comprises grouping the plurality of computing systems together based on at least one of:
    a role within the organization of the users of the plurality of computing systems as indicated by the telemetry information; or
    a department within the organization of the users that access the computing systems as indicated by the telemetry information.

4. The method of claim 1, further comprising grouping the plurality of computing systems together based on at least one of:
    a type of software installed on the computing systems as indicated by the telemetry information; or
    a version of software installed on the computing systems as indicated by the telemetry information.

5. The method of claim 1, wherein calculating the amount by which the cost for using the whitelist will increase if the file is included in the whitelist comprises basing the cost at least in part on a frequency with which the file is found within the group of computing systems.

6. The method of claim 1, wherein calculating the amount by which the cost for using the whitelist will increase if the file is included in the whitelist comprises basing the cost at least in part on a reputation of the file.

7. The method of claim 1, wherein balancing the increase in the cost against the increase in whitelist coverage comprises determining the coverage threshold that is met when at least a predefined percentage of computing systems in the group of computing systems store one or more computer files identified in the whitelist.

8. The method of claim 7, wherein balancing the increase in the cost against the increase in whitelist coverage comprises minimizing the cost for using the whitelist while still satisfying the coverage threshold.

9. The method of claim 1, wherein using the whitelist to protect the group of computing systems from undesirable computer files comprises at least one of:
    using the whitelist to protect the group of computing systems against malware; or
    using the whitelist to prevent users from installing applications that cause security vulnerabilities in the group of computing systems.

10. The method of claim 1, wherein calculating an amount by which whitelist coverage of computer files in the group of computing systems will increase if the file is included in the whitelist comprises evaluating a number of computing systems in the group of computing systems for which each file on the computing system is covered by the whitelist that includes the file.

11. The method of claim 10, further comprising evaluating the number of computing systems that are completely covered by different permutations of whitelists that include the file.

12. The method of claim 1, wherein establishing the whitelist of computer files for the group of computing systems comprises adding to the whitelist computer files that appear on at least a certain number of computing systems within the group of computing systems.

13. A system for automated whitelisting of computer files, the system comprising:
    a telemetry module, stored in memory, that obtains telemetry information that identifies, for each computing system in a set of computing systems, computer files located on the computing system and that groups selected computing systems based on how they are used within an organization by grouping the selected computing systems of the set of computing systems into a group of computing systems that each store a specific computer file and share a role or a department of users within the organization as indicated by the telemetry information;

a calculating module, stored in memory, that establishes a whitelist of computer files for the group of computing systems by, for each file identified by the telemetry information:

calculating an amount by which a cost for using the whitelist will increase if the file is included in the whitelist;

calculating an amount by which whitelist coverage of computer files in the group of computing systems will increase if the file is included in the whitelist;

determining whether to include the file in the whitelist by balancing the increase in the cost against the increase in whitelist coverage and determining if a coverage threshold is met;

a protecting module, stored in memory, that uses the whitelist to protect the group of computing systems from undesirable computer files by preventing the undesirable computer files from being installed on the group of computing systems protected by the whitelist; and at least one physical processor configured to execute the telemetry module, the calculating module, and the protecting module.

14. The system of claim 13, wherein the telemetry module creates the group of computing systems by grouping a plurality of computing systems together into telemetry module groups based on how they are used within an organization as indicated by the telemetry information.

15. The system of claim 14, wherein the telemetry module groups the plurality of computing systems together based on how they are used within the organization by grouping the plurality of computing systems together based on at least one of:

the role within the organization of the users of the plurality of computing systems as indicated by the telemetry information; or a department within the organization of the users that access the computing systems as indicated by the telemetry information.

16. The system of claim 13, wherein the telemetry module groups the plurality of computing systems together based on at least one of:

a type of software installed on the computing systems as indicated by the telemetry information; or a version of software installed on the computing systems as indicated by the telemetry information.

17. The system of claim 13, wherein the calculating module calculates the amount by which the cost for using the whitelist will increase if the file is included in the whitelist by basing the cost at least in part on a frequency with which the file is found within the group of computing systems.

18. The system of claim 13, wherein the calculating module calculates the amount by which the cost for using the whitelist will increase if the file is included in the whitelist by basing the cost at least in part on a reputation of the file.

19. The system of claim 13, wherein the calculating module balances the increase in the cost against the increase in whitelist coverage by determining the coverage threshold that is met when at least a predefined percentage of computing systems in the group of computing systems store one or more computer files identified in the whitelist.

20. A non-transitory computer-readable medium comprising one or more computer-readable instructions that, when executed by at least one processor of a computing device, cause the computing device to:

obtain, by the computing device, telemetry information that identifies, for each computing system in a set of computing systems, computer files located on the computing system;

group, by the computing device, selected computing systems based on how they are used within an organization by grouping the selected computing systems of the set of computing systems into a group of computing systems that each store a specific computer file and share a role or a department of users within the organization, as indicated by the telemetry information;

establish, by the computing device, a whitelist of computer files for the group of computing systems by, for each file identified by the telemetry information:

calculate an amount by which a cost for using the whitelist will increase if the file is included in the whitelist;

calculate an amount by which whitelist coverage of computer files in the group of computing systems will increase if the file is included in the whitelist;

determine whether to include the file in the whitelist by balancing the increase in the cost against the increase in whitelist coverage and determining if a coverage threshold is met; and use the whitelist to protect the group of computing systems from undesirable computer files by preventing the undesirable computer files from being installed on the group of computing systems protected by the whitelist.

* * * * *

UNITED STATES PATENT AND TRADEMARK OFFICE
CERTIFICATE OF CORRECTION

PATENT NO. : 10,200,395 B1
APPLICATION NO. : 15/084515
DATED : February 5, 2019
INVENTOR(S) : Kevin Alejandro Roundy et al.

Page 1 of 1

It is certified that error appears in the above-identified patent and that said Letters Patent is hereby corrected as shown below:

In the Claims

Column 20, Line 29, Claim 7, delete "that is" and insert -- is --, therefor.

Column 22, Line 15, Claim 19, delete "that is" and insert -- is --, therefor.

Signed and Sealed this
Twenty-sixth Day of March, 2019

Andrei Iancu
*Director of the United States Patent and Trademark Office*